(12) United States Patent
Fang et al.

(10) Patent No.: US 12,398,812 B2
(45) Date of Patent: Aug. 26, 2025

(54) INFLATING CONNECTOR

(71) Applicants: TALLGUY AND MARK PRECISION CO., LTD., Taichung (TW); CIRCUM AVANTI CO., LTD., Taichung (TW)

(72) Inventors: Shih-Yao Fang, Taichung (TW); Jung-Lung Hung, Taichung (TW)

(73) Assignees: TALLGUY AND MARK PRECISION CO., LTD., Taichung (TW); CIRCUM AVANTI CO., LTD., Taichung (TW)

( * ) Notice: Subject to any disclaimer, the term of this patent is extended or adjusted under 35 U.S.C. 154(b) by 55 days.

(21) Appl. No.: 18/518,812

(22) Filed: Nov. 24, 2023

(65) Prior Publication Data
US 2024/0288078 A1    Aug. 29, 2024

(30) Foreign Application Priority Data
Feb. 23, 2023    (TW) ................................. 112106816

(51) Int. Cl.
F16K 5/16          (2006.01)
F16K 1/30          (2006.01)
F16K 17/08         (2006.01)

(52) U.S. Cl.
CPC ............... *F16K 5/16* (2013.01); *F16K 1/306* (2013.01); *F16K 17/082* (2013.01)

(58) Field of Classification Search
CPC ... F16K 5/16; F16K 1/306; F16K 1/04; F16K 1/385; F16K 17/082; F16K 17/04; F16K 17/168; F17C 13/04; F04B 39/123; F04B 41/02
USPC .......................................... 137/226, 224, 234
See application file for complete search history.

(56) References Cited

U.S. PATENT DOCUMENTS

| | | | | |
|---|---|---|---|---|
| 1,699,378 A | * | 1/1929 | Smith ..................... | B60S 5/043 137/227 |
| 3,451,416 A | * | 6/1969 | Nyberg ............... | F16K 17/0473 137/115.18 |
| 3,648,893 A | * | 3/1972 | Whiting .................. | F16K 1/307 222/397 |
| 4,077,422 A | * | 3/1978 | Brinkley ................. | F17C 13/12 137/68.14 |

(Continued)

*Primary Examiner* — Craig M Schneider
*Assistant Examiner* — Andrew J Rost
(74) *Attorney, Agent, or Firm* — Muncy, Geissler, Olds & Lowe, P.C.

(57) ABSTRACT

An inflating connector includes a base, a pressure valve, a gas bottle connecting seat, and a throttling valve. The base has an assembling passageway, a first gas passageway communicating with the assembling passageway, and a second gas passageway communicating with the assembling passageway, a gas nozzle to be connected with the second gas passageway. The pressure valve has an elastic member and a piston, which are accommodated in the first gas passageway. The elastic member acts on the piston to make it close up the first gas passageway. The gas bottle is disposed on a side of the assembling passageway, and has a gas inlet passageway for being connected with a gas bottle and a gas outlet passageway communicating with the gas inlet passageway. The throttling valve has an operation unit and a throttling member capable of being driven by the operation unit to displace along the gas outlet passageway.

7 Claims, 14 Drawing Sheets

(56) References Cited

U.S. PATENT DOCUMENTS

| | | | | |
|---|---|---|---|---|
| 4,350,176 A | * | 9/1982 | Lace | F16K 17/04 |
| | | | | 137/554 |
| 4,911,403 A | * | 3/1990 | Lockwood, Jr. | F16K 1/305 |
| | | | | 251/210 |
| 5,048,554 A | * | 9/1991 | Kremer | F16K 1/305 |
| | | | | 137/69 |
| 5,671,775 A | * | 9/1997 | Miller | F16K 41/12 |
| | | | | 137/557 |
| 5,678,602 A | * | 10/1997 | Cannet | G05D 7/0186 |
| | | | | 137/500 |

* cited by examiner

INFLATING CONNECTOR

BACKGROUND OF THE INVENTION

1. Field of the Invention

The present invention relates to inflating connectors and more particularly, to an inflating connector which can change the intake gas quantity and intake gas pressure of the gas flowing into a bicycle tire from a gas bottle.

2. Description of the Related Art

The common bicycle tire inflating manners almost adopt an air pump to inflate by applying force for pressurized pumping. The presently commercially available air pumps are already smaller and smaller in size for the convenience of being carried by the user, but the reduced size causes the air pumps reduced gas quantity for inflating when applying force for pressurized pumping, so it requires the user relatively more effort and time to complete the bicycle tire inflating. Therefore, the bicycle tire inflating now changes to adopt the combination of a gas bottle filled with high-pressure gas with an inflating connector.

However, the current inflating connectors cannot adjust the intake gas quantity and intake gas pressure of the gas flowing into the bicycle tire from the gas bottle, resulting in that the bicycle tires often burst due to the over large intake gas quantity or over high intake gas pressure of the gas. Besides, if the user has the demand for measuring the intake gas pressure, the user has to additionally use a pressure gauge or use an air pump having a pressure gauge, that is very inconvenient for the user. Therefore, the current inflating connectors still need improvement.

SUMMARY OF THE INVENTION

The present invention has been accomplished in view of the above-noted circumstances. The present invention provides an inflating connector which can change the intake gas quantity and intake gas pressure of the gas flowing into the bicycle tire from the gas bottle.

To attain the above objective, the inflating connector of the present invention includes a base, a pressure valve, a gas bottle connecting seat, and a throttling valve. The base has a first rod portion, a second rod portion opposite to the first rod portion, an assembling passageway located between the first and second rod portions, a first gas passageway penetrating through the first rod portion axially and communicating with the assembling passageway, and a second gas passageway penetrating through the second rod portion axially and communicating with the assembling passageway. The first gas passageway has an entrance section communicating with the assembling passageway, an accommodating section communicating with the entrance section, and an exit located at the accommodating section. The second gas passageway is arranged for being connected with a gas nozzle. The pressure valve has a cover screwingly connected to the first rod portion, and an elastic member and a piston, which are accommodated in the accommodating section. The cover has an opening communicating with the exit. The piston is movably disposed in the accommodating section, and has a plug portion capable of closing up the entrance section and a rod portion connected with the plug portion. The elastic member acts on the piston to make the plug portion close up the entrance section. The gas bottle connecting seat is installed on a side of the assembling passageway. The gas bottle connecting seat has a gas inlet passageway, a gas outlet passageway communicating with the gas inlet passageway, a first connecting passageway communicating with the gas outlet passageway and the entrance section, and a second connecting passageway communicating with the gas outlet passageway and the second gas passageway. The gas inlet passageway is arranged for being connected with a gas bottle to enable gas in the gas bottle to flow to the gas outlet passageway. The throttling valve is installed on another side of the assembling passageway. The throttling valve has an operation unit, and a throttling member connected with the operation unit and accommodated in the gas outlet passageway. The operation unit is arranged for driving the throttling member to displace back and forth along an axis of the gas outlet passageway to change the size of a communication space between the gas outlet passageway and the first connecting passageway, the second connecting passageway and the gas inlet passageway.

By the above-described technical features, the inflating connector of the present invention changes the intake gas quantity and intake gas pressure of the gas by the adjustments of the throttling valve and the pressure valve, thereby preventing the bicycle tire from burst due to the over large intake gas quantity or over high intake gas pressure of the gas. Besides, the pressure valve can pre-set the magnitude of the intake gas pressure to make the intake gas pressure of the gas flowing into the bicycle tire smaller than the pre-set intake gas pressure, so that the user doesn't need to additionally use a pressure gauge or use an air pump having a pressure gauge to measure if the intake gas pressure is over high, that is very convenient for the user.

Preferably, it is not completely gastight between the plug portion of the piston and a wall of the accommodating section of the first gas passageway.

Preferably, it is completely gastight between the plug portion of the piston and a wall of the accommodating section of the first gas passageway, and the rod portion of the piston is inserted through the exit of the first gas passageway and the opening of the cover.

Preferably, it is not completely gastight between the plug portion of the piston and a wall of the accommodating section of the first gas passageway, and the rod portion of the piston is inserted through the exit of the first gas passageway and the opening of the cover; the base has a third gas passageway penetrating through the first rod portion radially and communicating with the accommodating section; the pressure valve has a switch sleeved onto the first rod portion; the switch is slidable relative to the first rod portion back and forth to close up or not close up the third gas passageway.

Preferably, the base has a fourth gas passageway penetrating through the first rod portion radially and communicating with the accommodating section; the fourth gas passageway is arranged apart from the third gas passageway; when the third gas passageway is not closed up by the switch of the pressure valve, the gas in the gas bottle flows to the fourth gas passageway through the third gas passageway; when the third gas passageway is closed up by the switch of the pressure valve, the gas in the gas bottle is disabled from flowing to the fourth gas passageway through the third gas passageway.

Preferably, the operation unit of the throttling valve includes a sleeve sleeved onto the throttling member, an elastic member accommodated in the sleeve, and a pin inserted in the throttling member; the elastic member acts on the throttling member to make the throttling member partially close up the communication space; the throttling member has an external thread; a wall of the gas outlet passageway of the gas bottle connecting seat has an internal thread; the pin is pivotable relative to the sleeve to drive the throttling member in a way that the external thread of the throttling member is guided by the internal thread of the gas outlet passageway to make the throttling member displace back and forth along the axis of the gas outlet passageway.

Preferably, the gas inlet passageway of the gas bottle connecting seat has a connecting path and an installation path communicating with the connecting path, and a wall of the installation path has an internal thread; the gas bottle connecting seat has an inserting member accommodated in the installation path; the internal thread of the installation path is arranged for being screwingly connected with a bottleneck of the gas bottle so that the inserting member is inserted in the bottleneck of the gas bottle. In this way, the inserting member is inserted in the bottleneck of the gas bottle to allow the gas in the gas bottle to flow into the gas inlet passageway.

The detailed structure, features, assembly or usage of the inflating connector provided by the present invention will be described in the following detailed description of embodiments. However, those skilled in the field of the present invention should understand that the detailed descriptions and specific embodiments instanced for implementing the present invention are given by way of illustration only, not intended to limit the scope of the claims of the present invention.

BRIEF DESCRIPTION OF THE DRAWINGS

The inflating connector of the present invention will be further described in the following embodiments and the accompanying drawings, and wherein.

DETAILED DESCRIPTION OF THE INVENTION

First of all, it is to be mentioned that the technical features provided by the present invention are unlimited to the specific structure, usage and application thereof described in the detailed description of the invention. It should be understood by those skilled in the related art that all the terms used in the contents of the specification are for illustrative description. The directional terms mentioned in this specification, such as 'front, upper, lower, rear, left, right, top, bottom, in, and out', are also just for illustrative description on the basis of normal usage direction, not intended to limit the claimed scope.

Figure 1:
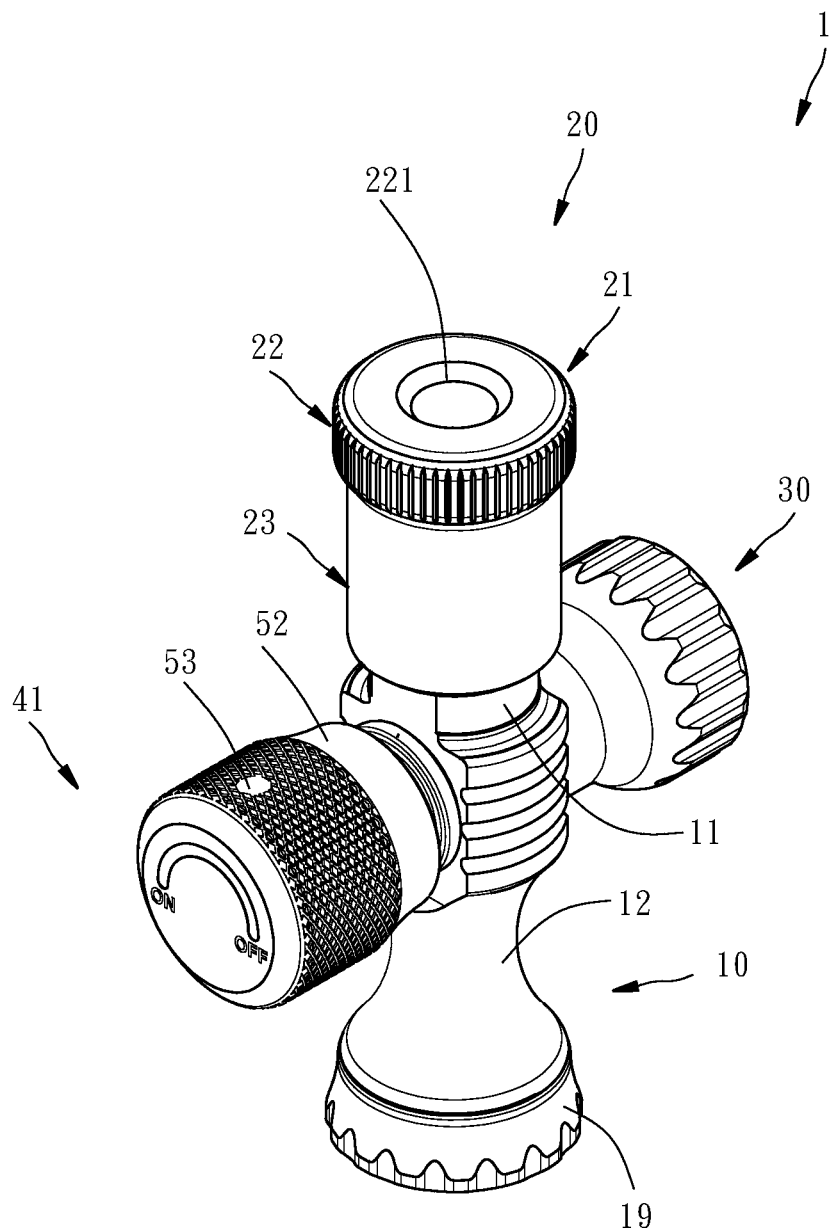
FIG. 1 is an assembled perspective view of an inflating connector according to a first embodiment of the present invention.

Referring to FIG. 1, an inflating connector 1 according to a first embodiment of the present invention includes a base 10, a pressure valve 20, a gas bottle connecting seat 30, and a throttling valve 41.

Figure 2:
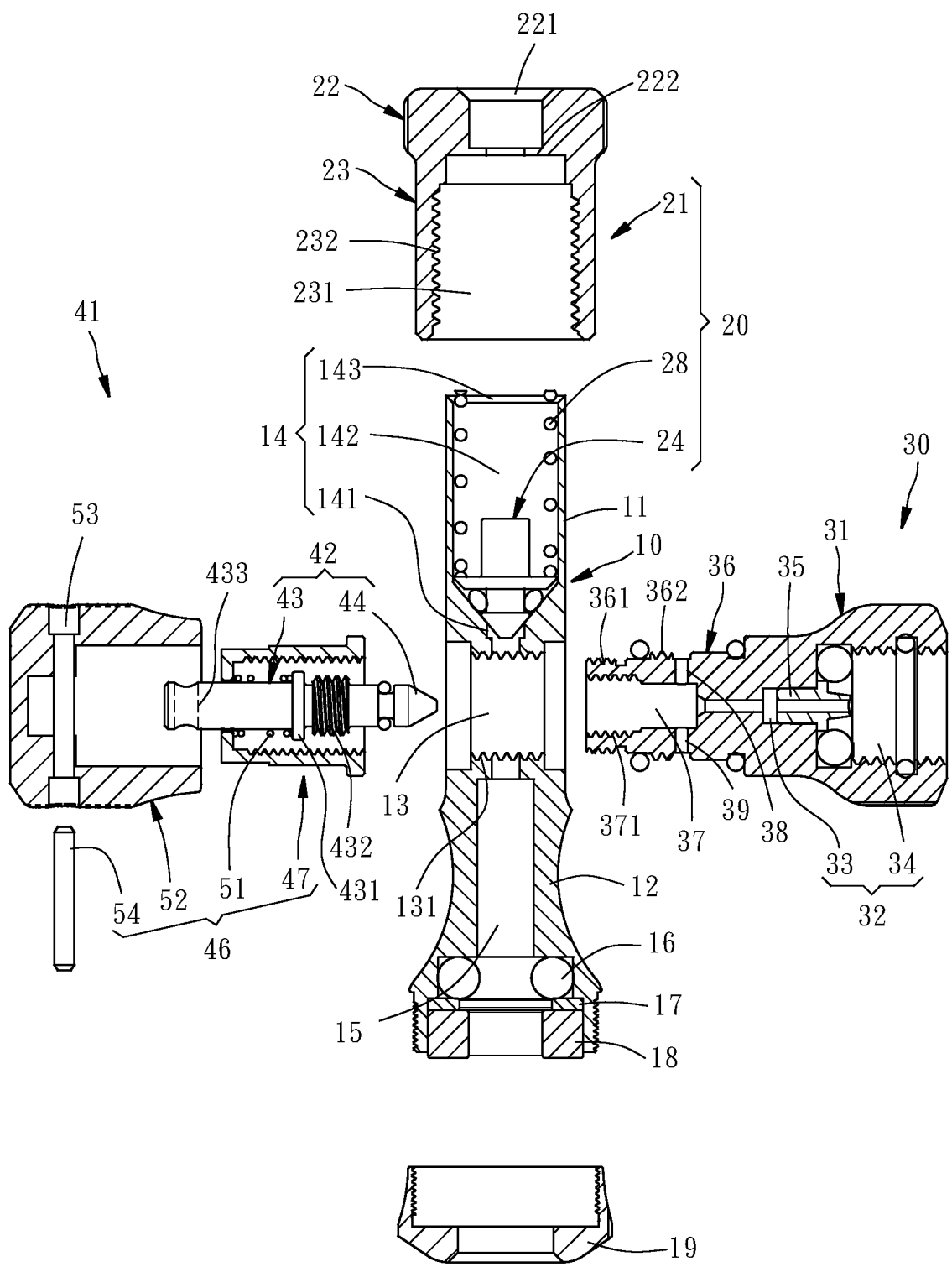
FIG. 2 is a partially exploded sectional view of the inflating connector according to the first embodiment of the present invention.
Figure 3:
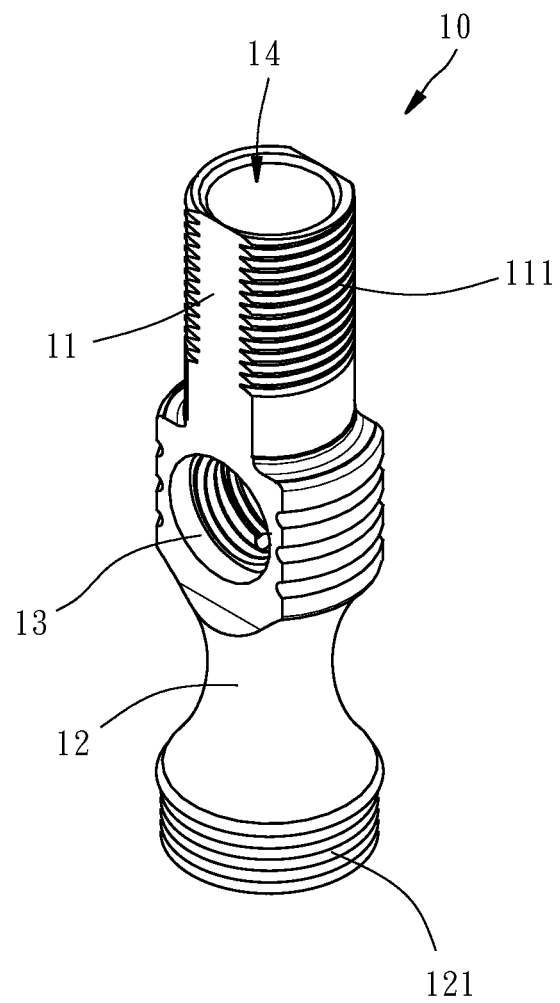
FIG. 3 is a perspective view of a base of the inflating connector according to the first embodiment of the present invention.

Referring to FIG. 2 and FIG. 3, the base 10 has a first rod portion 11, and a second rod portion 12 opposite to the first rod portion 11. The outer peripheral surfaces of the first and second rod portions 11 and 12 each have an external thread 111 or 121. The base 10 further has an assembling passageway 13 located between the first and second rod portions 11 and 12, a first gas passageway 14 penetrating through the first rod portion 11 axially and communicating with the assembling passageway 13, and a second gas passageway 15 penetrating through the second rod portion 12 axially and communicating with the assembling passageway 13. The wall of the assembling passageway 13 has an internal thread 131. The first gas passageway 14 has an entrance section 141 communicating with the assembling passageway 13, an accommodating section 142 communicating with the entrance section 141, and an exit 143 located at the upper end of the accommodating section 142. There are an O-ring 16, a spacer 17 and a clamper 18 disposed in the second gas passageway 15 in order. The spacer 17 is abutted against the O-ring 16 for preventing the O-ring 16 from dropping off the second gas passageway 15, and an end cover 19 is screwed onto the external thread 121 of the second rod portion 12 in a way that the end cover 19 is abutted against the clamper 18 for preventing the clamper 18 from dropping off the second gas passageway 15. In this way, when the base 10 is connected with a gas nozzle, which may be but unlimited to an American valve, French valve or English valve, the clamper 18 can make the gas nozzle inserted in the second gas passageway 15 relatively more stably. Besides, the O-ring 16 prevents the gas from leaking along the wall of the second gas passageway 15.

Figure 4:
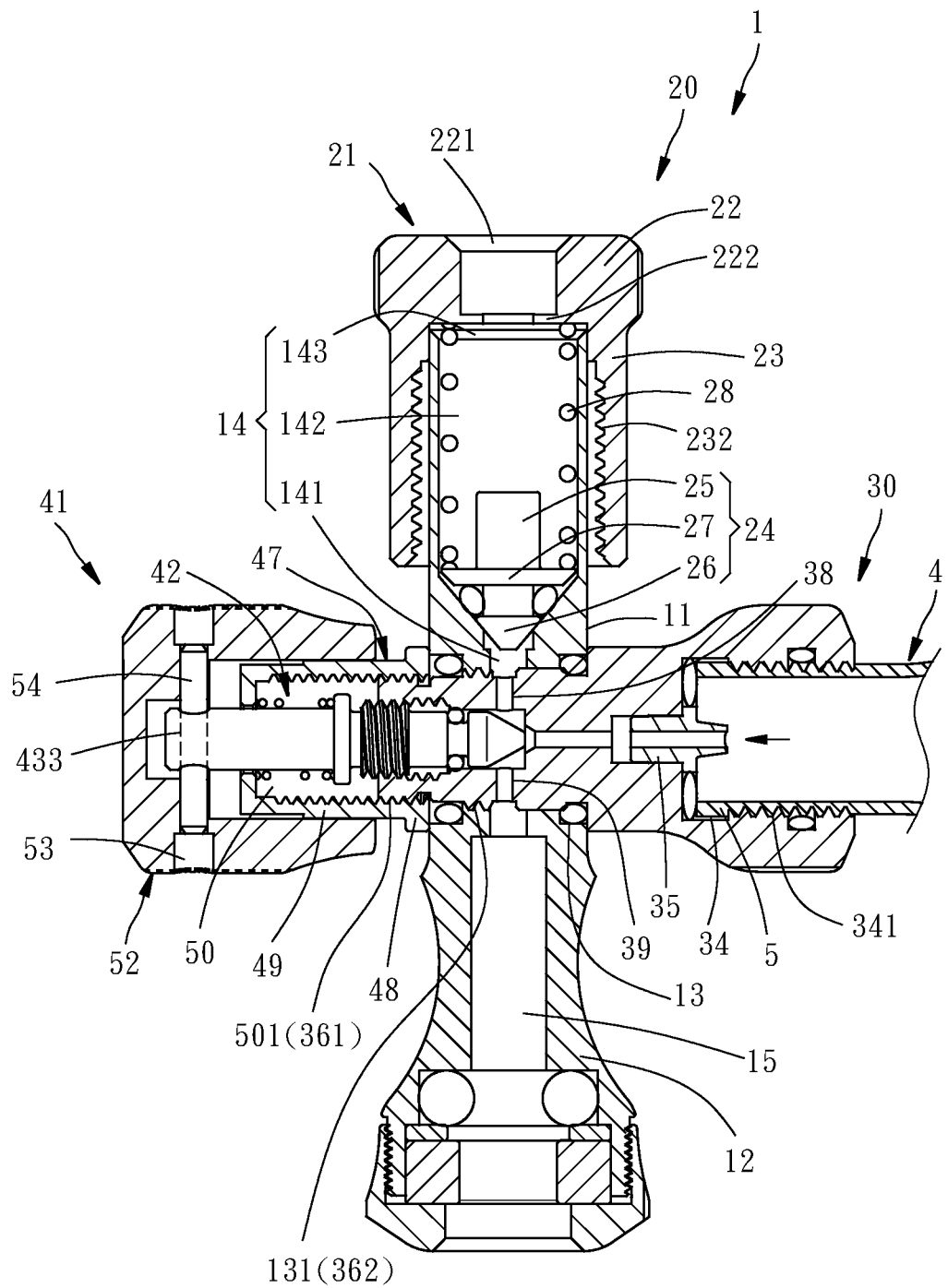
FIG. 4 is an axially sectional view of the inflating connector according to the first embodiment of the present invention, showing the status that a gas bottle is connected to a gas bottle connecting seat.

Referring to FIG. 2 and FIG. 4, in this embodiment, the pressure valve 20 includes a cover 21, a piston 24, and an elastic member 28.

The cover 21 has a head portion 22, and an annular body portion 23 connected with the head portion 22. The head portion 22 has an opening 221. The inner peripheral surface of the head portion 22 has an inner flange 222 protruding along radial direction of the opening 221. The annular body portion 23 has a cover accommodating space 231. The wall of the cover accommodating space 231 has an internal thread 232. In practical assembly, the cover 21 is screwed onto the external thread 111 of the first rod portion 11 as shown in FIG. 3 by the internal thread 232 so that the first rod portion 11 is accommodated in the cover accommodating space 231, and the opening 221 communicates with the exit 143 of the first gas passageway 14.

The piston 24 is movably accommodated in the accommodating section 142 of the first gas passageway 14. The piston 24 has a rod portion 25, a plug portion 26 connected with the rod portion 25, and an outer flange 27 connected between the rod portion 25 and the plug portion 26.

The elastic member 28 is implemented by a coil spring. The elastic member 28 is accommodated in the accommodating section 142 of the first gas passageway 14. An end of the elastic member 28 is abutted against the inner flange 222 of the cover 21, and the other end is abutted against the outer flange 27 of the piston 24. In this way, the elastic member 28 can provide an elastic restoring force acted on the piston 24 to enable the plug portion 26 of the piston 24 to close up the entrance section 141 of the first gas passageway 14.

Figure 5:
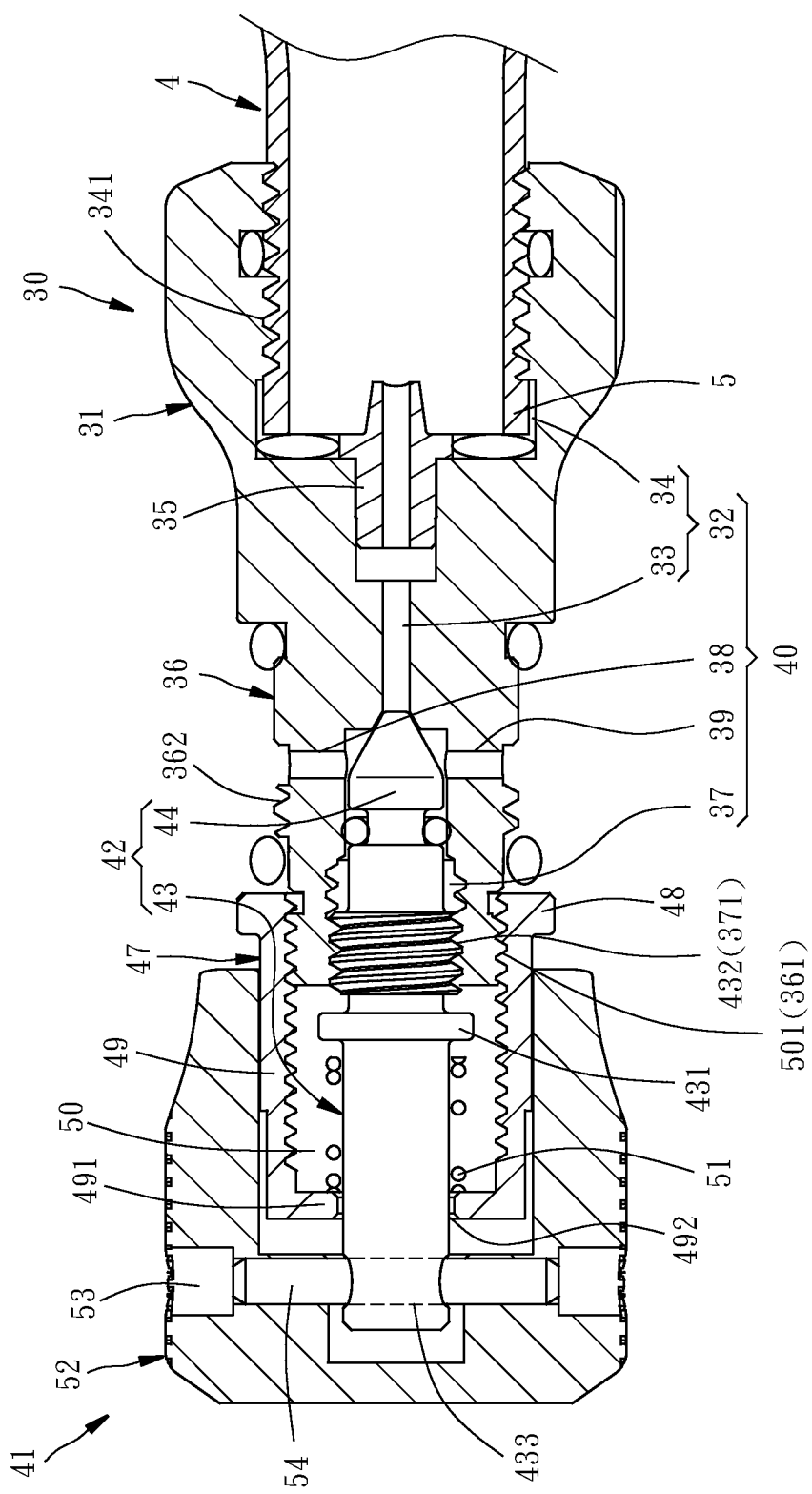
FIG. 5 is a partial enlarged view of FIG. 4, showing the status that a throttling member approaches a connecting path.

As shown in FIG. 2 and FIG. 4, the gas bottle connecting seat 30 has an installation portion 31, and a joining portion 36 connected with the installation portion 31. The installation portion 31 has a gas inlet passageway 32. The gas inlet passageway 32 includes a connecting path 33, and an installation path 34 communicating with the connecting path 33. As shown in FIG. 4 and FIG. 5, the wall of the installation path 34 has an internal thread 341, and an inserting member 35 is accommodated in the installation path 34. The outer peripheral surface of the joining portion 36 has a first external thread 361 and a second external thread 362. The first external thread 361 and the second external thread 362 are arranged apart from each other. The joining portion 36 further has a gas outlet passageway 37 communicating with the gas inlet passageway 32, a first connecting passageway 38 communicating with the gas outlet passageway 37, and a second connecting passageway 39 communicating with the gas outlet passageway 37. A communication space 40 as shown in FIG. 5 is formed between the gas outlet passageway 37, the first and second connecting passageways 38 and 39 and the gas inlet passageway 32. Besides, as shown in FIG. 5, the wall of the gas outlet passageway 37 has an internal thread 371. In practical application, the gas bottle connecting seat 30 is installed on the right side of the assembling passageway 13 of the base 10 in a way that the second external thread 362 of the joining portion 36 is screwingly connected with the internal thread 131 of the assembling passageway 13 of the base 10, making the first connecting passageway 38 and the second connecting passageway 39 communicate with the entrance section 141 of the first gas passageway 14 and the second gas passageway 15 respectively. Besides, as shown in FIG. 5, the gas bottle connecting seat 30 is screwed onto a bottleneck 5 of a gas bottle 4 by the internal thread 341 of the installation path 34, and the inserting member 35 is inserted in the bottleneck 5 of the gas bottle 4, thereby allowing the gas in the gas bottle 4 to flow to the gas outlet passageway 37 through the gas inlet passageway 32.

Referring to FIG. 2 and FIG. 4, in this embodiment, the throttling valve 41 includes a throttling member 42 and an operation unit 46. The throttling member 42 has a rod-shaped body portion 43, and a gas blocking portion 44 connected with the rod-shaped body portion 43. As shown in FIG. 2, the right end of the rod-shaped body portion 43 has an abutted flange 431, and an external thread 432 arranged apart from the abutted flange 431. The left end of the rod-shaped body portion 43 has a pivot hole 433. In this way, as shown in FIG. 5, the rod-shaped body portion 43 of the throttling member 42 is inserted in the gas outlet passageway 37 of the gas bottle connecting seat 30, and the external thread 432 of the rod-shaped body portion 43 is screwingly connected with the internal thread 371 of the gas outlet passageway 37 of the gas bottle connecting seat 30.

Referring to FIG. 2, the operation unit 46 includes a sleeve 47, an elastic member 51, a swivel cap 52, and a pin 54.

As shown in FIG. 5, the sleeve 47 is sleeved onto the throttling member 42 and screwed onto the joining portion 36 of the gas bottle connecting seat 30. The sleeve 47 has a bottom plate 48, a tube-shaped body portion 49 extending from the bottom plate 48, and a tube-shaped accommodating space 50 formed by the bottom plate 48 and the tube-shaped body portion 49. The tube-shaped body portion 49 has an end wall 491, and a through hole 492 penetrating through the end wall 491 and communicating with the tube-shaped accommodating space 50. The wall of the tube-shaped accommodating space 50 has an internal thread 501. In practical application, as shown in FIG. 4 and FIG. 5, the tube-shaped body portion 49 of the sleeve 47 is sleeved onto the throttling member 42 in a way that the rod-shaped body portion 43 of the throttling member 42 is inserted through the through hole 492, and the internal thread 501 of the tube-shaped accommodating space 50 is screwingly connected with the first external thread 361 of the joining portion 36 of the gas bottle connecting seat 30, making the bottom plate 48 abutted against the left side of the assembling passageway 13.

As shown in FIG. 5, the elastic member 51 is accommodated in the tube-shaped accommodating space 50 of the sleeve 47. An end of the elastic member 51 is abutted against the end wall 491 of the tube-shaped body portion 49 of the sleeve 47, and the other end is abutted against the abutted flange 431 of the throttling member 42. In this way, the elastic member 51 provides an elastic restoring force acted on the throttling member 42 to enable the gas blocking portion 44 of the throttling member 42 to partially cover the connecting path 33 of the gas inlet passageway 32.

As shown in FIG. 4 and FIG. 5, the swivel cap 52 is sleeved onto the tube-shaped body portion 49 of the sleeve 47, and the swivel cap 52 has a through hole 53. The pin 54 is inserted through the pivot hole 433 of the throttling member 42 and the through hole 53 of the swivel cap 52.

Figure 6:
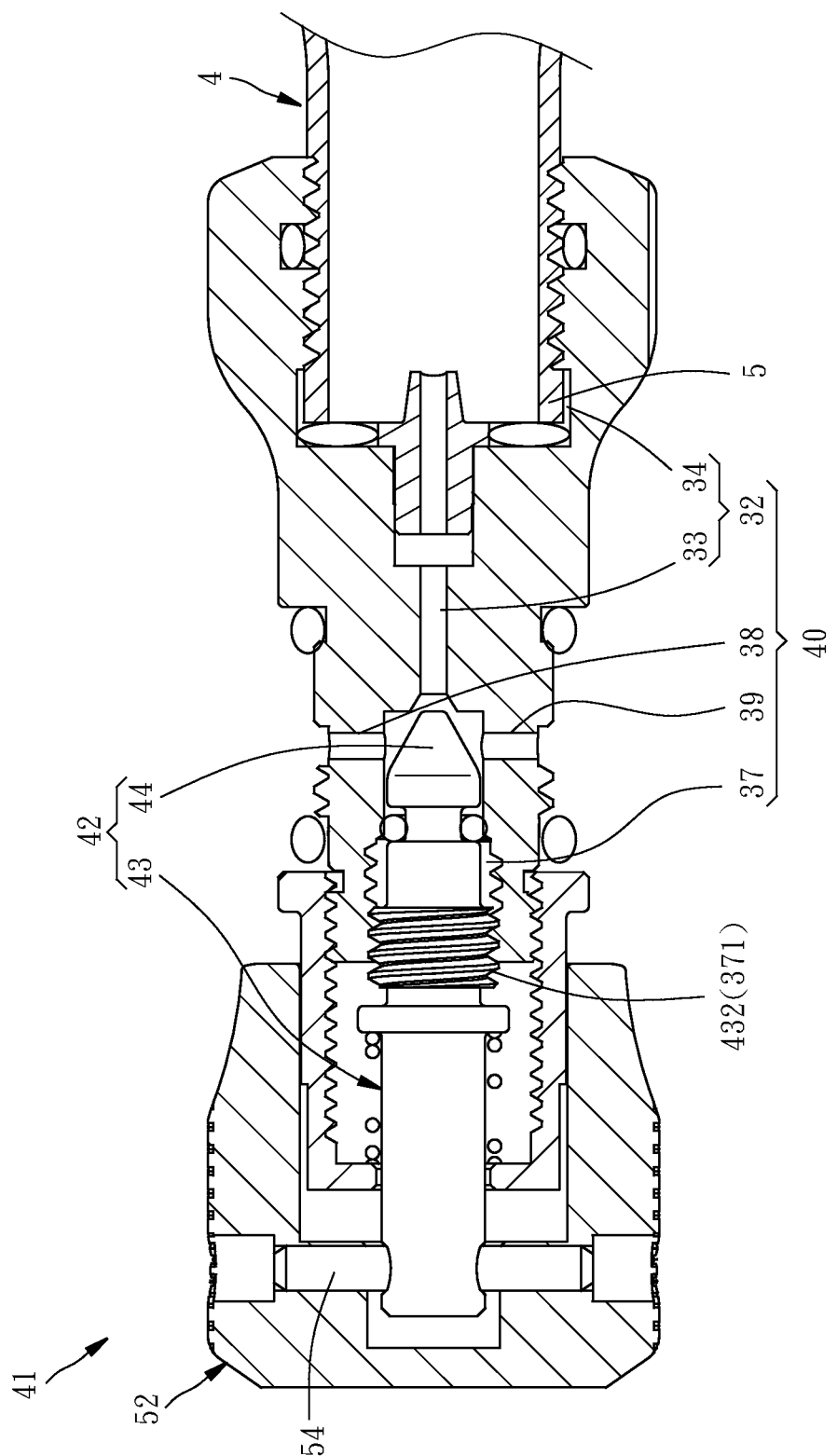
FIG. 6 is similar to FIG. 5, showing the status that the throttling member moves away from the connecting path.

In practical operation, as shown in FIG. 5, when the swivel cap 52 is applied with force to rotate clockwise, the pin 54 is pivoted relative to the sleeve 47 to drive the rod-shaped body portion 43 of the throttling member 42 to displace to the right along the axis of the gas outlet passageway 37, making the gas blocking portion 44 of the throttling member 42 approach the connecting path 33 of the gas inlet passageway 32 to reduce the size of the communication space 40. On the contrary, as shown in FIG. 6, when the swivel cap 52 is applied with force to rotate counterclockwise, the pin 54 is pivoted relative to the sleeve 47 to drive the rod-shaped body portion 43 of the throttling member 42 to displace to the left along the axis of the gas outlet passageway 37, making the gas blocking portion 44 of the throttling member 42 move away from the connecting path 33 of the gas inlet passageway 32 to increase the size of the communication space 40.

The structures of the components of the inflating connector 1 according to the first embodiment of the present invention are described above. The usage manner of the inflating connector 1 according to the first embodiment of the present invention will be further introduced hereinafter.

The user can adjust the throttling valve 41 to change the intake gas quantity of the gas. Further speaking, as shown in FIG. 5, at first the bottleneck 5 of the gas bottle 4 is screwed into the installation path 34 of the gas bottle connecting seat 30 to make the gas in the gas bottle 4 flow into the gas outlet passageway 37 through the gas inlet passageway 32. If the intake gas quantity of the gas is over large, as shown in FIG. 5, the user has to rotate the swivel cap 52 clockwise to make the swivel cap 52 and the pin 54 pivot clockwise relative to the sleeve 47 to drive the rod-shaped body portion 43 of the throttling member 42 to displace to the right along the axis of the gas outlet passageway 37, causing the gas blocking portion 44 of the throttling member 42 to approach the connecting path 33 of the gas inlet passageway 32, thereby reducing the size of the communication space 40, so as to reduce the intake gas quantity of the gas. If the intake gas quantity of the gas is too small, as shown in FIG. 6, the user has to rotate the swivel cap 52 counterclockwise to make the swivel cap 52 and the pin 54 pivot counterclockwise relative to the sleeve 47 and drive the rod-shaped body portion 43 of the throttling member 42 to displace to the left along the axis of the gas outlet passageway 37, causing the gas blocking portion 44 of the throttling member 42 to move away from the connecting path 33 of the gas inlet passageway 32, thereby increasing the size of the communication space 40, so as to increase the intake gas quantity of the gas.

Figure 7:
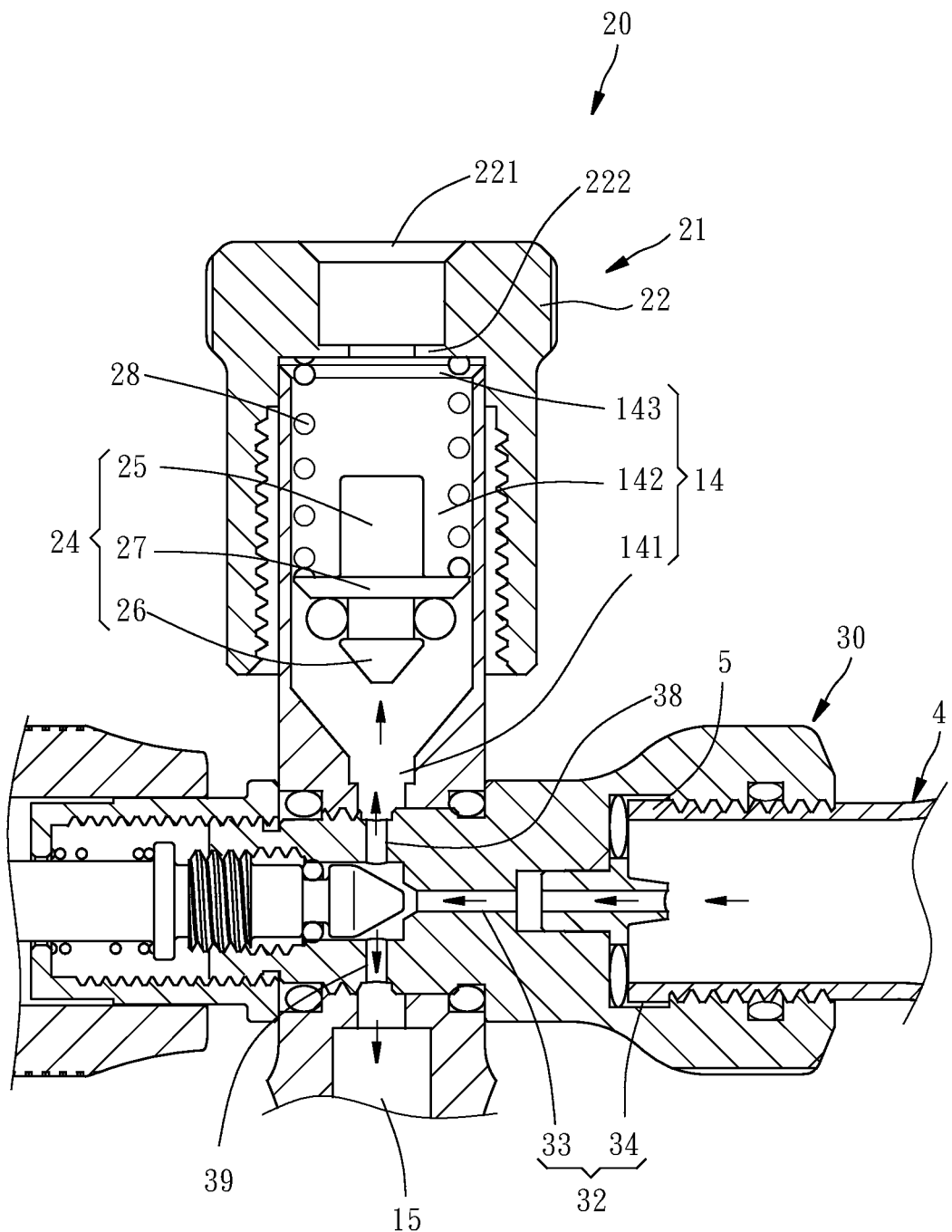
FIG. 7 is a partial enlarged view of FIG. 4, showing the status that a piston is displaced upwardly.
Figure 8:
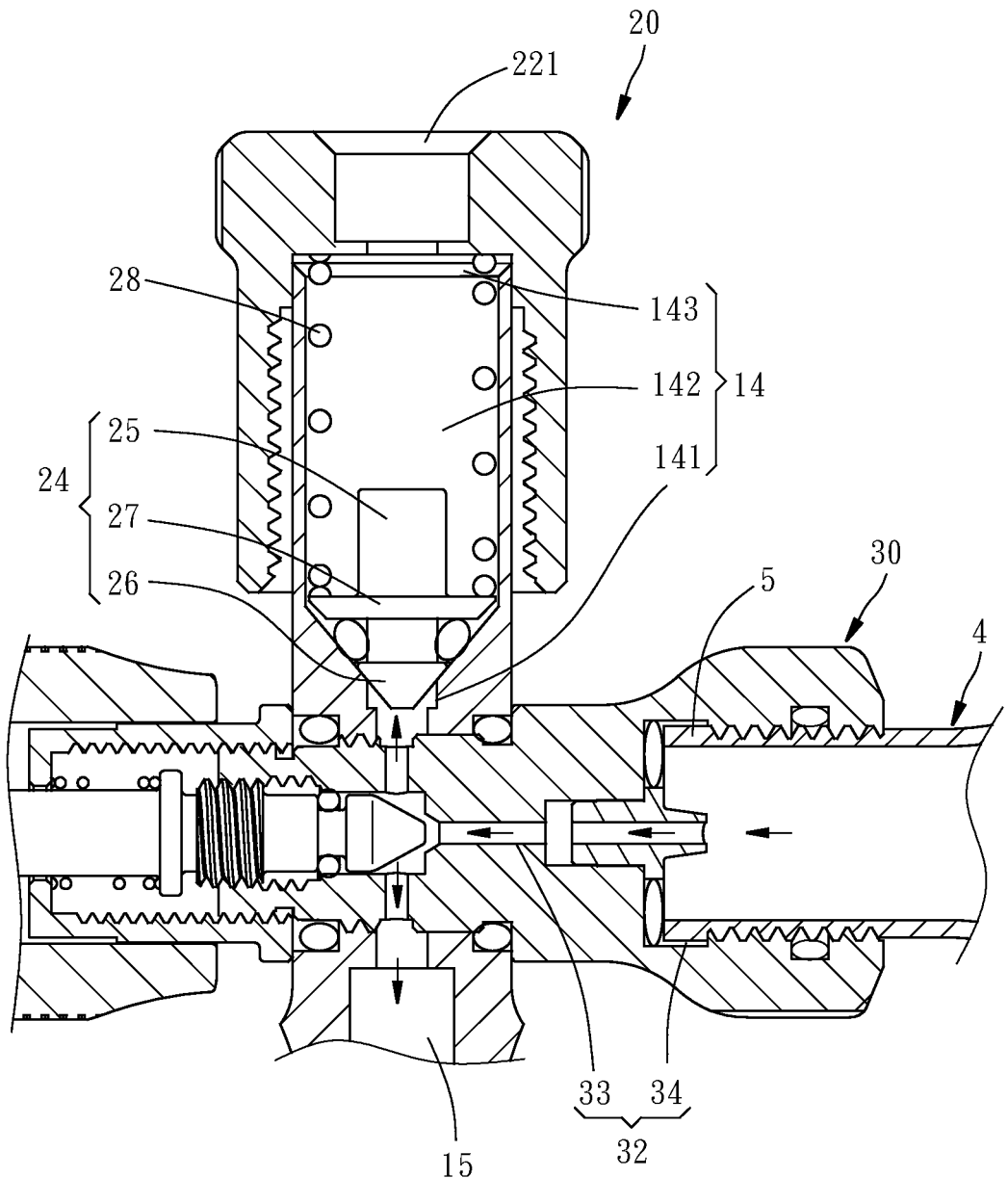
FIG. 8 is similar to FIG. 7, showing the status that an entrance section is closed up by a plug portion of the piston.

Besides, the user can adjust the pressure valve 20 to change the intake gas pressure of the gas. Further speaking, as shown in FIG. 4, at first the cover 21 is rotated downwardly relative to the first rod portion 11, and the elastic member 28 is compressed by the inner flange 222, thereby setting a predetermined pressure. In this embodiment, the cover 21 is screwingly disposed at the most bottom end of the external thread 111 of the first rod portion 11 as shown in FIG. 3. After that, the bottleneck 5 of the gas bottle 4 is screwed into the installation path 34 of the gas bottle connecting seat 30. As shown in FIG. 7, the gas flows into the gas inlet passageway 32, and flows into the entrance section 141 of the first gas passageway 14 through the first connecting passageway 38. In this embodiment, there is a gap between the plug portion 26 of the piston 24 and the wall of the accommodating section 142 of the first gas passageway 14, so it cannot be completely gastight there. At this time, if the intake gas pressure of the gas is larger than the predetermined pressure, the plug portion 26 of the piston 24 is pushed upwardly by the gas, so that the piston 24 is moved upwardly. At this time, the elastic member 28 is pushed by the piston 24 upwardly and thereby stores the elastic restoring force, so that a gap is produced between the plug portion 26 of the piston 24 and the accommodating section 142 of the first gas passageway 14, and the gas can flow out through the exit 143 of the first gas passageway 14 and the opening 221 of the cover 21 to reduce the intake gas pressure of the gas. Once the intake gas pressure of the gas is smaller than the predetermined pressure, the gas cannot push the plug portion 26 of the piston 24 upwardly anymore. At this time, the elastic restoring force stored by the elastic member 28 acts on the piston 24 to make the piston 24 move downwardly from the position as shown in FIG. 7 to the position as shown in FIG. 8, causing the plug portion 26 of the piston 24 to close up the entrance section 141 of the first gas passageway 14 again.

In addition, the cover 21 can be rotated upwardly to different positions for setting different predetermined pressures. Besides, the rod portion 25 of the piston 24 may be configured to be inserted through the exit 143 of the first gas passageway 14 and the opening 221 of the cover 21, and the rod portion 25 is marked with several graduations (not shown). At this time, if the intake gas pressure of the gas is larger than the predetermined pressure, the plug portion 26 of the piston 24 is pushed by the gas upwardly, so that the piston 24 is moved upwardly. The rod portion 25 of the piston 24 protrudes out of the head portion 22 of the cover 21. The user can know about the current intake gas pressure of the gas through the graduations on the rod portion 25.

Figure 9:
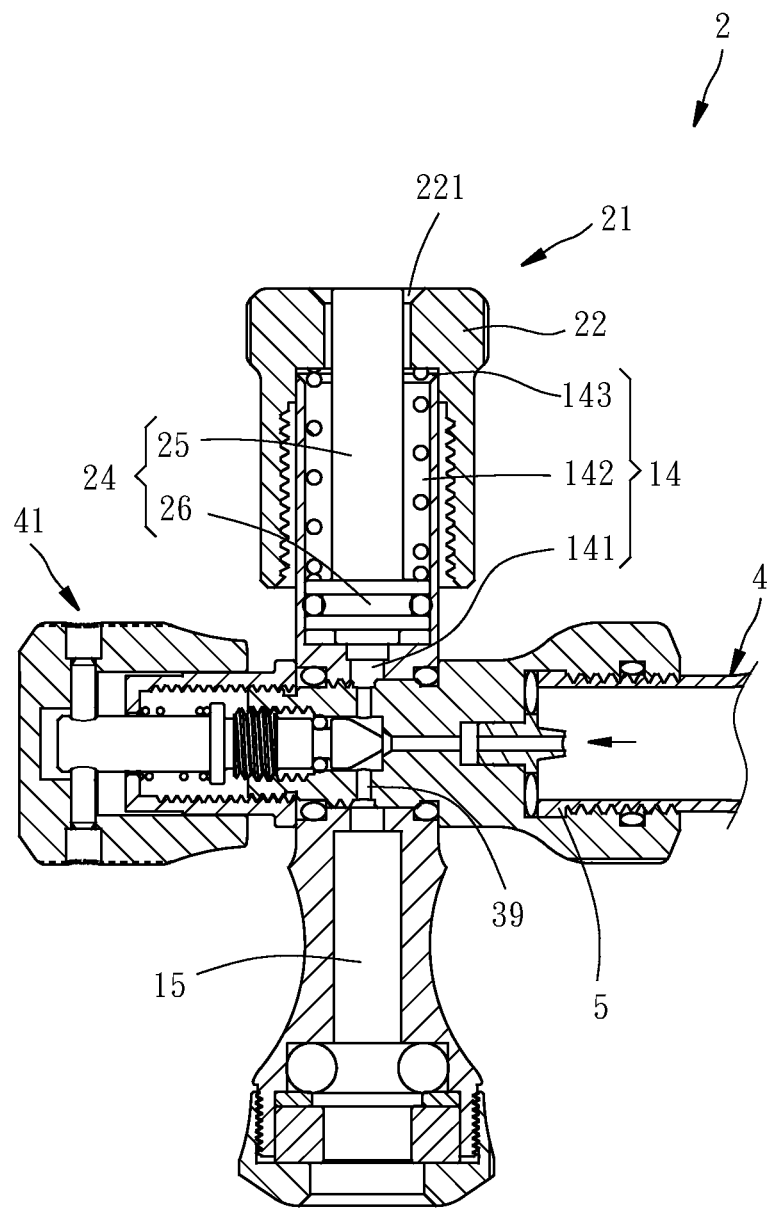
FIG. 9 is an axially sectional view of an inflating connector according to a second embodiment of the present invention, showing the status that a gas bottle is connected to a gas bottle connecting seat.
Figure 10:
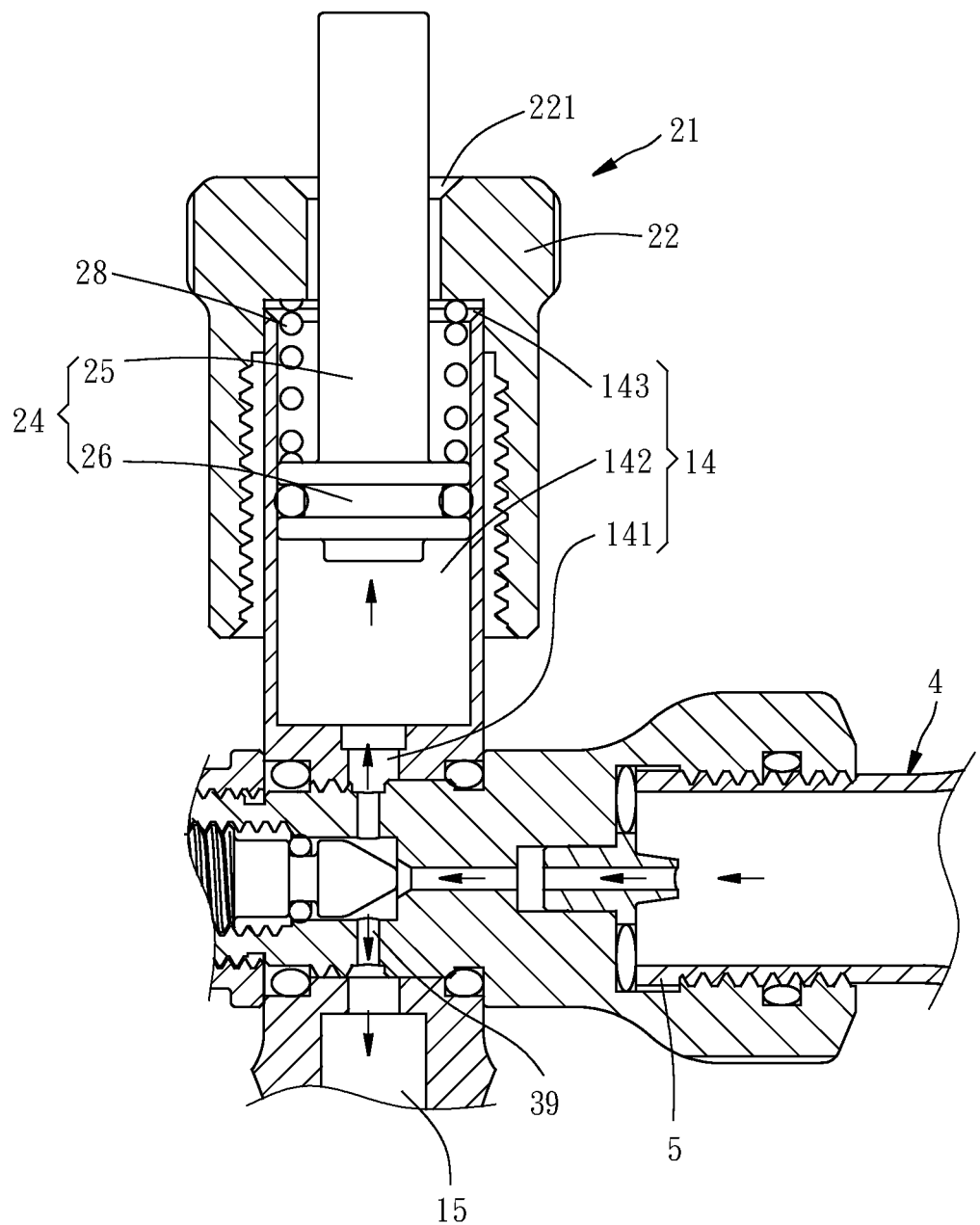
FIG. 10 is a partial enlarged view of FIG. 9, showing the status that a piston is displaced upwardly.
Figure 11:
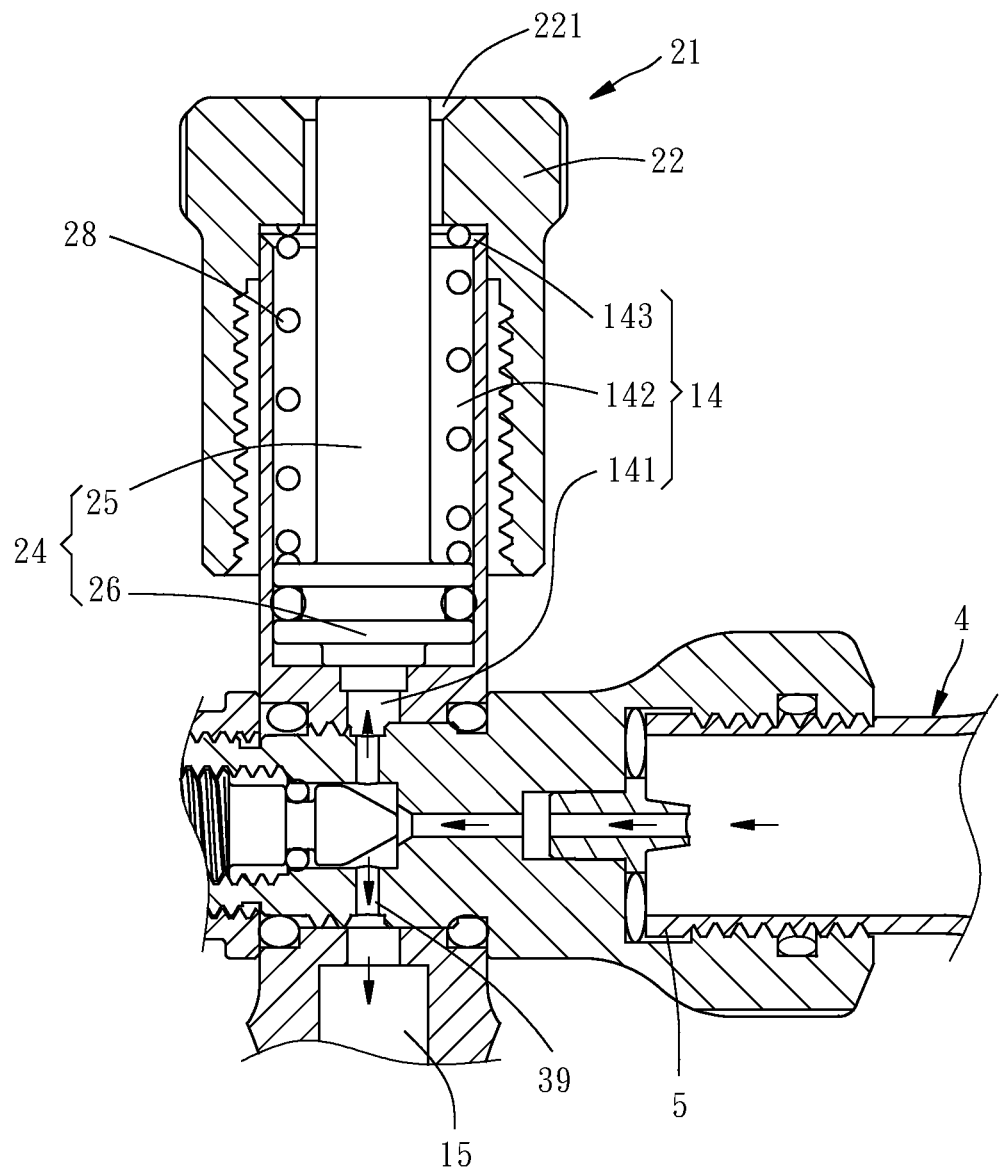
FIG. 11 is similar to FIG. 10, showing the status that an entrance section is closed up by a plug portion of a piston.

However, the present invention is unlimited to that disclosed in this embodiment. Referring to FIG. 9, an inflating connector 2 according to a second embodiment of the present invention is approximately the same in structure and operation manner with the first embodiment. The primary difference is that it is completely gastight between the plug portion 26 of the piston 24 and the wall of the accommodating section 142 of the first gas passageway 14. Therefore, the gas cannot flow out along the wall of the accommodating section 142 of the first gas passageway 14. The gas all flows into the second gas passageway 15 through the second connecting passageway 39. Besides, the rod portion 25 of the piston 24 is marked with several graduations (not shown) and inserted through the exit 143 of the first gas passageway 14 and the opening 221 of the cover 21. As shown in FIG. 10, at this time, if the intake gas pressure of the gas is larger than the predetermined pressure, the plug portion 26 of the piston 24 is pushed by the gas upwardly, so that the piston 24 is moved upwardly. At this time, the elastic member 28 is pushed by the piston 24 upwardly and thereby stores the elastic restoring force, causing the rod portion 25 of the piston 24 to protrude out of the head portion 22 of the cover 21. At this time, the user can know about the current intake gas pressure of the gas through the graduations on the rod portion 25. At this time, if the intake gas pressure of the gas is smaller than the predetermined pressure, as shown in FIG. 11, the gas cannot push the plug portion 26 of the piston 24, so that the entrance section 141 of the first gas passageway 14 is closed up by the plug portion 26 of the piston 24. In addition, the adjusting manner of the throttling valve 41 provided by this embodiment is completely the same with that of the inflating connector 1 according to the first embodiment of the present invention, thereby not repeatedly described.

Figure 12:
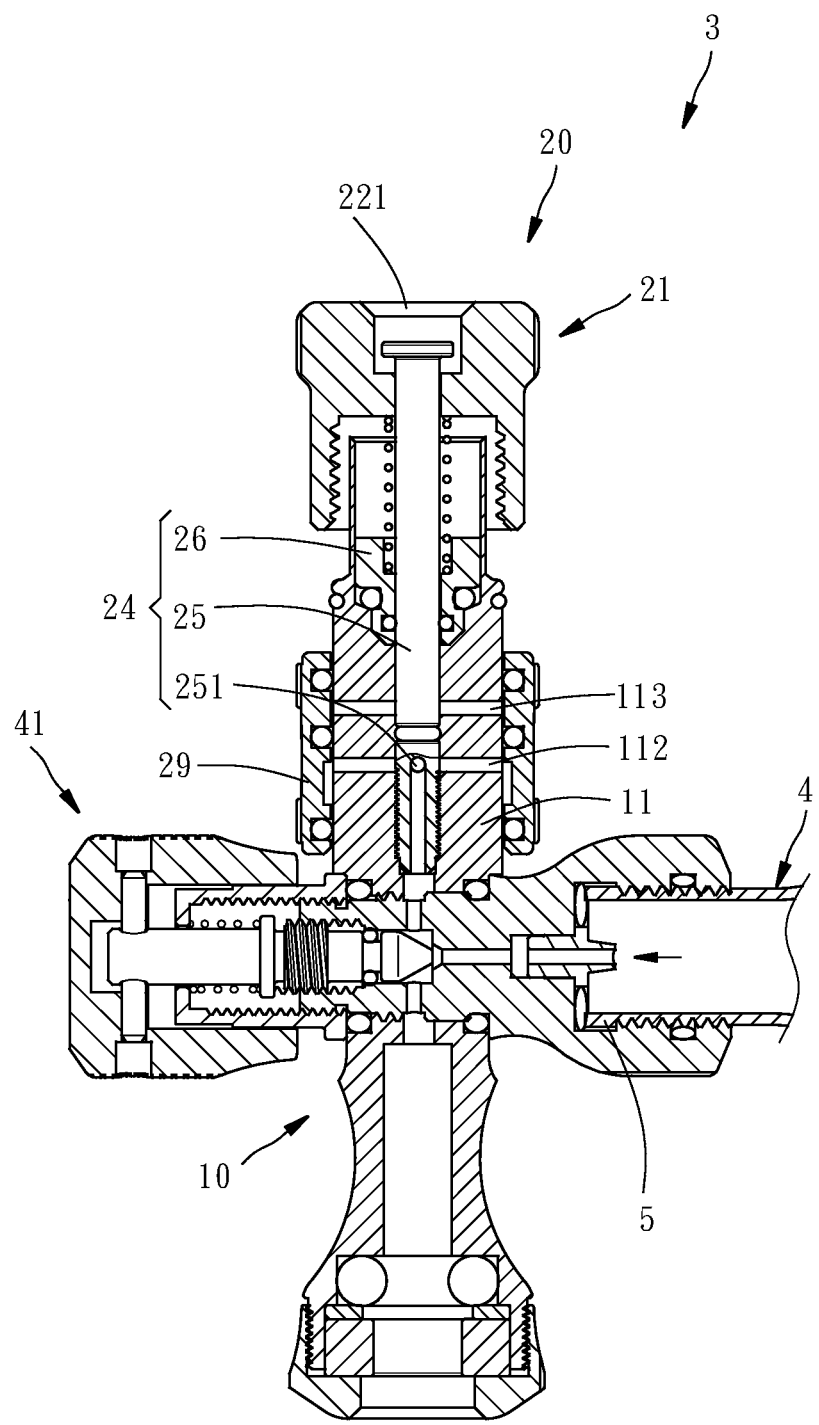
FIG. 12 is an axially sectional view of an inflating connector according to a third embodiment of the present invention, showing the status that a gas bottle is connected to a gas bottle connecting seat.
Figure 13:
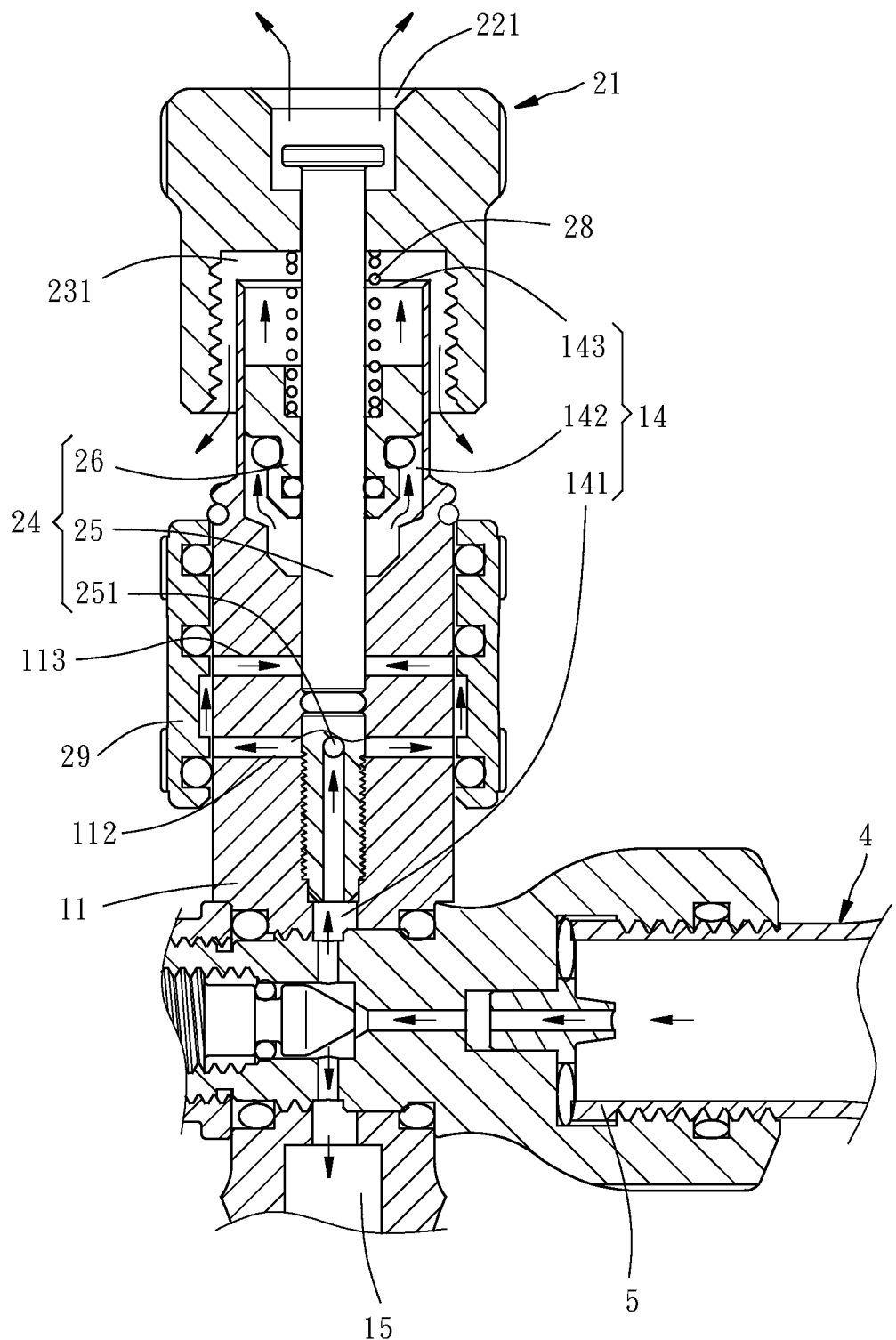
FIG. 13 is a partial enlarged view of FIG. 12, showing the status that a third gas passageway is not closed up by a switch and a piston is displaced upwardly.
Figure 14:
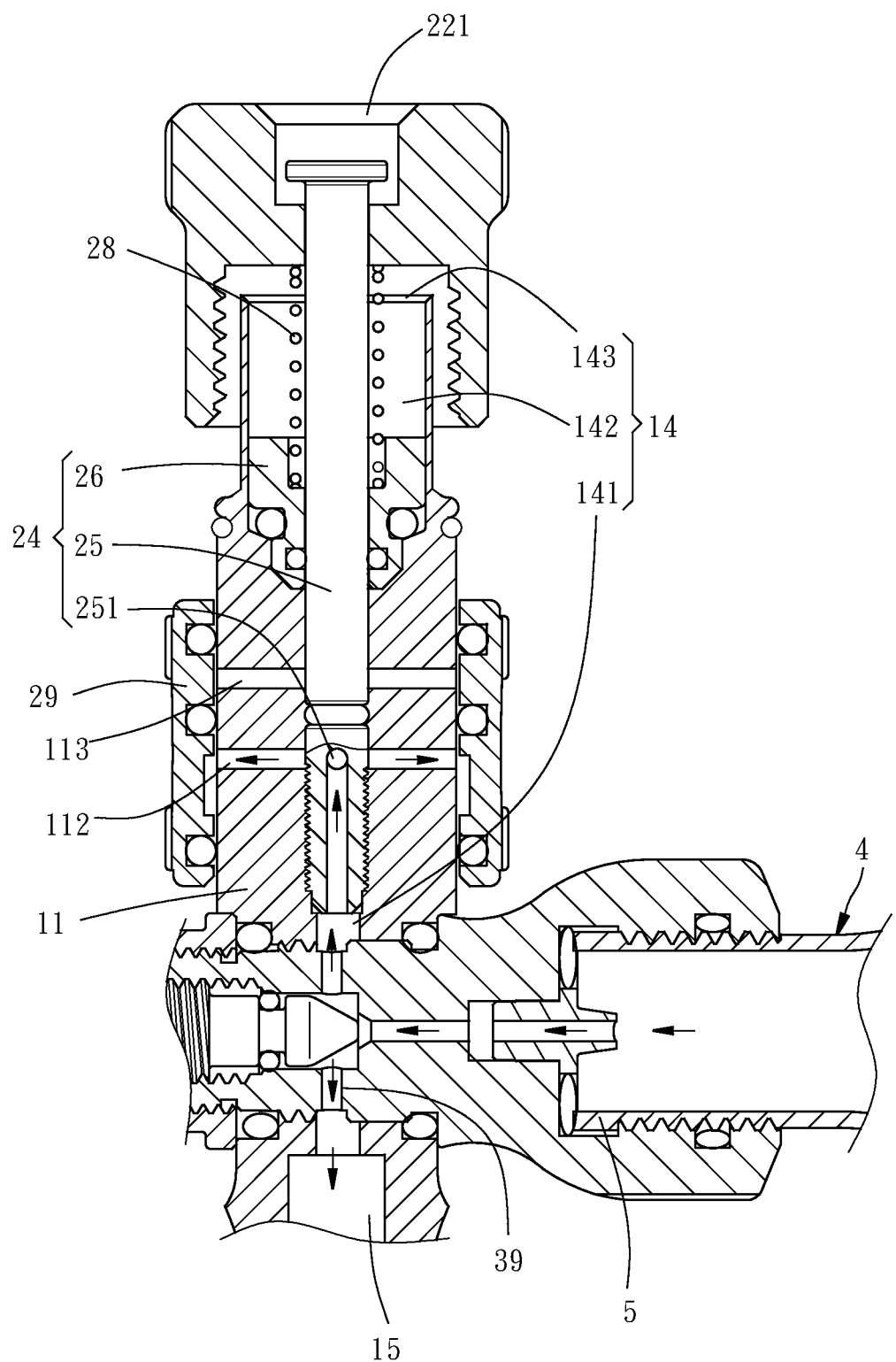
FIG. 14 is similar to FIG. 13, showing the status that the third gas passageway is closed up by the switch.

Referring to FIG. 12, an inflating connector 3 according to a third embodiment of the present invention is approximately the same in structure and operation manner with the second embodiment. The primary difference is that the base 10 further has a third gas passageway 112 and a fourth gas passageway 113, which penetrate through the first rod portion 11 radially. The third gas passageway 112 and the fourth gas passageway 113 are arranged apart from each other. In this embodiment, there is a gap between the plug portion 26 of the piston 24 and the wall of the accommodating section 142 of the first gas passageway 14, so it cannot be completely gastight there. The rod portion 25 of the piston 24 further has a through hole 251 penetrating therethrough, and the rod portion 25 is inserted through the exit 143 of the first gas passageway 14 and the opening 221 of the cover 21. The pressure valve 20 further includes a switch 29 sleeved onto the first rod portion 11. As shown in FIG. 13, at first the third gas passageway 112 is not closed up by the switch 29, so the gas flows into the third gas passageway 112 through the through hole 251 of the rod portion 25 of the piston 24 and flows to the fourth gas passageway 113. At this time, if the intake gas pressure of the gas is larger than the predetermined pressure, the gas flows to the accommodating section 142 of the first gas passageway 14 from the fourth gas passageway 113, flows upwardly along the wall of the accommodating section 142 of the first gas passageway 14, and then pushes the plug portion 26 of the piston 24 upwardly, so that the plug portion 26 of the piston 24 is moved upwardly. At this time, the elastic member 28 is pushed by the plug portion 26 of the piston 24 upwardly and thereby stores the elastic restoring force, so that a gap is produced between the plug portion 26 of the piston 24 and the accommodating section 142 of the first gas passageway 14. Therefore, the gas can flow out through the exit 143 of the first gas passageway 14 and the opening 221 of the cover 21, or flow out through the gap between the cover accommodating space 231 of the cover 21 and the first rod portion 11, thereby reducing the intake gas pressure of the gas. Once the intake gas pressure of the gas is smaller than the predetermined pressure, the gas cannot push the plug portion 26 of the piston 24 upwardly anymore. At this time, the elastic restoring force stored by the elastic member 28 acts on the plug portion 26 of the piston 24 to make the plug portion 26 of the piston 24 move downwardly from the position as shown in FIG. 13 to the position as shown in FIG. 14. The user can apply force to move the switch 29 downwardly relative to the first rod portion 11 from the position as shown in FIG. 13 to the position as shown in FIG. 14 to make the third gas passageway 112 closed up by the switch 29. At this time, the gas cannot flow to the fourth gas passageway 113 through the third gas passageway 112, so the gas all flows into the second gas passageway 15 through the second connecting passageway 39 and flows into the gas nozzle, so that the inflating of the bicycle tire (not shown) installed with the gas nozzle can be accomplished quickly. In addition, the adjusting manner of the throttling valve 41 provided by this embodiment is completely the same with that of the inflating connector 1 according to the first embodiment of the present invention, thereby not repeatedly described.

In conclusion, the inflating connector 1, 2, 3 of the present invention changes the intake gas quantity and intake gas pressure of the gas by the adjustments of the throttling valve 41 and the pressure valve 20, thereby preventing the bicycle tire from burst due to the over large intake gas quantity or the over high intake gas pressure of the gas. Besides, the pressure valve 20 of the inflating connector 1, 2, 3 of the present invention can pre-set the intake gas pressure of the gas to make the intake gas pressure of the gas flowing into the bicycle tire smaller than the pre-set intake gas pressure, so that the user doesn't need to additionally use a pressure gauge or use an air pump having a pressure gauge to measure if the intake gas pressure is over high, that is very convenient for the user.

What is claimed is:

1. An inflating connector, which is adapted for being detachably combined with a gas bottle and a gas nozzle, the inflating connector being characterized in comprising:

a base having a first rod portion, a second rod portion opposite to the first rod portion, an assembling passageway located between the first and second rod portions, a first gas passageway penetrating through the first rod portion axially and communicating with the assembling passageway, and a second gas passageway penetrating through the second rod portion axially and communicating with the assembling passageway, the first gas passageway having an entrance section communicating with the assembling passageway, an accommodating section communicating with the entrance section, and an exit located at the accommodating section, the second gas passageway being arranged for being connected with the gas nozzle;

a pressure valve having a cover screwingly connected to the first rod portion, and an elastic member and a piston, which are accommodated in the accommodating section, the cover having an opening communicating with the exit, the piston being movably disposed in the accommodating section and having a plug portion capable of closing up the entrance section and a rod portion connected with the plug portion, the elastic member acting on the piston to make the plug portion close up the entrance section;

a gas bottle connecting seat installed on a side of the assembling passageway, the gas bottle connecting seat having a gas inlet passageway, a gas outlet passageway communicating with the gas inlet passageway, a first connecting passageway communicating with the gas outlet passageway and the entrance section, and a second connecting passageway communicating with the gas outlet passageway and the second gas passageway, the gas inlet passageway being arranged for being connected with the gas bottle to enable gas in the gas bottle to flow to the gas outlet passageway; and a throttling valve installed on another side of the assembling passageway, the throttling valve having an operation unit and a throttling member connected with the operation unit and accommodated in the gas outlet passageway, the operation unit being arranged for driving the throttling member to displace back and forth along an axis of the gas outlet passageway to change size of a communication space between the gas outlet passageway and the first connecting passageway, the second connecting passageway and the gas inlet passageway.

2. The inflating connector as claimed in claim 1, which is characterized in that it is not completely gastight between the plug portion of the piston and a wall of the accommodating section of the first gas passageway.

3. The inflating connector as claimed in claim 1, which is characterized in that it is completely gastight between the plug portion of the piston and a wall of the accommodating section of the first gas passageway, and the rod portion of the piston is inserted through the exit of the first gas passageway and the opening of the cover.

4. The inflating connector as claimed in claim 1, which is characterized in that it is not completely gastight between the plug portion of the piston and a wall of the accommodating section of the first gas passageway, and the rod portion of the piston is inserted through the exit of the first gas passageway and the opening of the cover; the base has a third gas passageway penetrating through the first rod portion radially and communicating with the accommodating section; the pressure valve has a switch sleeved onto the first rod portion; the switch is slidable back and forth relative to the first rod portion to close up or not close up the third gas passageway.

5. The inflating connector as claimed in claim 4, which is characterized in that the base has a fourth gas passageway penetrating through the first rod portion radially and communicating with the accommodating section, and the fourth gas passageway is arranged apart from the third gas passageway; when the third gas passageway is not closed up by the switch of the pressure valve, the gas in the gas bottle flows to the fourth gas passageway through the third gas passageway; when the third gas passageway is closed up by the switch of the pressure valve, the gas in the gas bottle is disabled from flowing to the fourth gas passageway through the third gas passageway.

6. The inflating connector as claimed in claim 1, which is characterized in that the operation unit of the throttling valve comprises a sleeve sleeved onto the throttling member, an elastic member accommodated in the sleeve, and a pin inserted in the throttling member; the elastic member acts on the throttling member to make the throttling member partially close up the communication space; the throttling member has an external thread; a wall of the gas outlet passageway of the gas bottle connecting seat has an internal thread; the pin is pivotable relative to the sleeve to drive the throttling member in a way that the external thread of the throttling member is guided by the internal thread of the gas outlet passageway to make the throttling member displace back and forth along the axis of the gas outlet passageway.

7. The inflating connector as claimed in claim 1, which is characterized in that the gas inlet passageway of the gas bottle connecting seat has a connecting path and an installation path communicating with the connecting path, and a wall of the installation path has an internal thread; the gas bottle connecting seat has an inserting member accommodated in the installation path; the internal thread of the installation path is arranged for being screwingly connected with a bottleneck of the gas bottle so that the inserting member is inserted in the bottleneck of the gas bottle.

* * * * *